United States Patent Office 3,686,185
Patented Aug. 22, 1972

3,686,185
9,10-DIAZATETRACYCLO[6.3.0.0$^{4,11}$.0$^{5,9}$]
UNDECANE COMPOUNDS
Philip M. Weintraub and John R. Challey, Ashland, Ohio, assignors to Richardson-Merrell, Inc., New York, N.Y.
No Drawing. Filed May 11, 1970, Ser. No. 36,411
Int. Cl. C07d 57/02
U.S. Cl. 260—293.55                      8 Claims

ABSTRACT OF THE DISCLOSURE

Novel 9,10 - diazatetracyclo[6.3.0.0$^{4,11}$.0$^{5,9}$]undecane compounds having utility as anticoccidial agents and having the formula

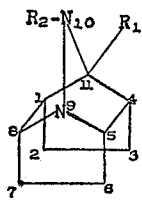

wherein $R_1$ and $R_2$ are individually hydrogen, alkyl containing from 1 to 4 carbon atoms, lower alkanoyl

wherein R is lower alkyl having from 1 to 4 carbon atoms, benzyl, phenyl, or a phenyl radical substituted by at least one substituent selected from lower alkyl containing from 1 to 4 carbon atoms, lower alkoxy containing from 1 to 4 carbon atoms, carboxy, halogen or nitro, and with the proviso that the nitrogen atoms of the 9,10-diazatetracyclo[6.3.0.0$^{4,11}$.0$^{5,9}$]undecane compound may be quaternized with lower alkyl radicals, are disclosed.

This invention relates to novel 9,10-diazatetracyclo [6.3.0.0$^{4,11}$.0$^{5,9}$]undecane compounds and to methods of preparing the same. More particularly this invention relates to novel 9,10-diazatetracyclo[6.3.0.0$^{4,11}$.0$^{5,9}$]undecane compounds having utility as anticoccidial agents and to methods of preparing the same.

The novel 9,10 - diazatetracyclo[6.3.0.0$^{4,11}$.0$^{5,9}$]undecane compounds of this invention have the formula:

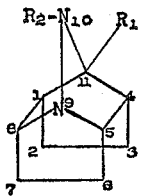

wherein $R_1$ and $R_2$ are individually hydrogen, alkyl containing from 1 to 4 carbon atoms, acyl

wherein R is lower alkyl having from 1 to 4 carbon atoms, benzyl, phenyl, or a phenyl radical substituted by at least one substituent selected from lower alkyl containing from 1 to 4 carbon atoms, lower alkoxy containing from 1 to 4 carbon atoms, carboxy, halogen such as chlorine, bromine, fluorine and iodine, or nitro, and with the proviso that the nitrogen atoms of the 9,10-diazatetracyclo- [6.3.0.0$^{4,11}$.0$^{5,9}$]undecane compound may be quaternized with lower alkyl radicals. Also included by this invention are the acid addition salts of the above described 9,10 - diazatetracyclo[6.3.0.0$^{4,11}$.0$^{5,9}$]undecane compounds.

The radicals $R_1$ and $R_2$ of the hereinbefore set forth formula may be hydrogen atoms, lower alkyl such as, for example, methyl, ethyl, propyl, or butyl, acyl such as for example, acetyl, benzyl, phenyl, or substituted phenyl radicals such as, for example, 4-methylphenyl, 4-methoxyphenyl and the like in the compounds included by this invention.

As examples of 9,10 - diazatetracyclo[6.3.0.0$^{4,11}$.0$^{5,9}$] undecane compounds of this invention there may be mentioned, for example, the following compounds:

9,10-diaza-10-phenyltetracyclo[6.3.0.0$^{4,11}$.0$^{5,9}$]undecane
9,10-diaza-10,11-diphenyltetracyclo[6.3.0.0$^{4,11}$.0$^{5,9}$] undecane
9,10-diaza-10-(4-methyl-3-nitrophenyl)tetracyclo- [6.3.0.0$^{4,11}$.0$^{5,9}$]undecane
9,10-diaza-10-(4-methylphenyl)tetracyclo[6.3.0.0$^{4,11}$.0$^{5,9}$] undecane
9,10-diaza-10-(4-methoxyphenyl)tetracyclo- [6.3.0.0$^{4,11}$.0$^{5,9}$]undecane
10-(4-chlorophenyl)-9,10-diazatetracyclo[6.3.0.0$^{4,11}$.0$^{5,9}$] undecane
9,10-diaza-11-ethyl-10-phenyltetracyclo[6.3.0.0$^{4,11}$.0$^{5,9}$] undecane
10-benzyl-9,10-diazatetracyclo[6.3.0.0$^{4,11}$.0$^{5,9}$]undecane
9,10-diaza-10-phenyltetracyclo[6.3.0.0$^{4,11}$.0$^{5,9}$]undecane- 9-methiodide
9,10-diaza-10-phenyltetracyclo[6.3.0.0$^{4,11}$.0$^{5,9}$]undecane- 10-methiodide
9,10-diaza-11-methyl-10-phenyltetracyclo[6.3.0.0$^{4,11}$.0$^{5,9}$] undecane
9,10-diaza-10-acetyltetracyclo[6.3.0.0$^{4,11}$.0$^{5,9}$]undecane, and
9,10-diaza-10-(4-carboxyphenyltetracyclo) [6.3.0.0$^{4,11}$.0$^{5,9}$]undecane The novel 9,10-diazatetracyclo[6.3.0.0$^{4,11}$.0$^{5,9}$]undecane compounds of this invention can be prepared by reacting a sydnone having the formula

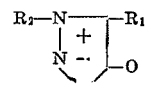

wherein $R_1$ and $R_2$ are as defined hereinbefore, with a large excess of 1,5-cyclooctadiene at an elevated temperature of about 150° C. The reaction may be carried out either in the presence or in the absence of suitable inert high boiling organic solvents. The reaction product is purified by any suitable purification means; generally, by simple recrystallization.

In a preferred procedure for producing the novel 9,10- diazatetracyclo[6.3.0.0$^{4,11}$.0$^{5,9}$]undecane compounds of this invention the appropriate sydnone is reacted with a large excess of 1,5-cyclooctadiene at an elevated temperature of up to about 170° C., most preferably at least 150° C., under nitrogen atmosphere for a period of up to about 72 hours, preferably for a period of from about 18 to 24 hours. The reaction solution is cooled and diluted with ether and extracted at least twice with a 5 to 10% aqueous hydrochloric acid solution. The combined aqueous extracts are backwashed with ether to remove the last traces of neutral and acidic materials and then made basic with a suitable basic material such as, for example, either 10% aqueous sodium hydroxide solution or concentrated ammonium hydroxide solution, preferably with concentrated ammonium hydroxide solution. The milky mixture is extracted with generous portions of ether and the combined ether extracts are backwashed with water, dried, charcoaled and the solvent removed. The purification is accomplished through simple recrystallization although any other suitable purification means may be employed.

The following reaction scheme is illustrative of the method of producing the novel compounds of this invention

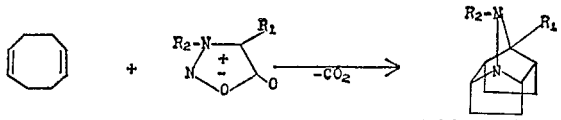

The invention also includes the acid addition salts of the compounds of the hereinbefore set forth formula such as those salts of inorganic acids such as, for example, hydrochloric, hydrobromic, sulphuric, phosphoric acids and the like, and with organic carboxylic acids such as, for example, acetic, propionic, glycolic, lactic, pyruvic, oxalic, malonic, succinic, fumaric, malic, tartaric, citric, ascorbic, maleic, hydroxymaleic, dihydroxymaleic, benzoic, phenylacetic, 4-aminobenzoic, 4-hydroxybenzoic, anthranilic, cinnamic, salicylic, 4-aminosalicylic, 2-phenoxybenzoic, 2-acetoxybenzoic and the like as well as picric acid and the like. Especially preferred are the pharmaceutically acceptable acid addition salts.

Novel 9,10 - diazatetracyclo[6.3.0.0$^{4,11}$.0$^{5,9}$]undecane compounds of this invention exhibit anticoccidial activity and are especially useful as anticoccidial agents against *Eimeria tenella* and *Eimeria acervulina*. Coccidiosis is a common and widespread poultry disease caused by species of protozoal parasites of the genus Eimeria. This disease is especially prevalent in poultry such as chickens or turkeys and the disease occurs in the form of severe intestinal infection resulting in poor weight gain, reduced feed efficiency and oftentimes proves fatal. It has been discovered that 9,10-diazatetracyclo[6.3.0$^{411}$.0$^{5,}$,9]undecane compounds of this invention have utility in checking coccidiosis in poultry.

The 9,10-diazatetracyclo[6.3.0.0$^{4,11}$.0$^{5,9}$]undecane compounds are employed in anticoccidial compositions comprising a physiologically acceptable carrier material and a 9,10-diazatetracyclo[6.3.0.0$^{4,11}$.0$^{5,9}$]undecane compound as the active anticoccidial agent. The anticoccidial compositions can be prepared by mixing the 9,10-diazatetracyclo[6.3.0.0$^{4,11}$.0$^{5,9}$]undecane compounds with a physiologically acceptable carrier material in uniform and finely divided form such as, for example, by mixing, grinding, stirring or by spraying dilute solutions onto solid feeds. It is possible to produce anticoccidial composition concentrates which then as additives are diluted with basic feed prior to feeding. As examples of suitable physiologically acceptable carrier materials, there may be mentioned for example grain, side products of milling industries, ground oil cake, distillation residues of fermentation industries, finely divided mineral materials, ground oyster shells, silicon dioxide, corn-meal, citrus meal, molasses solubles, corncob meal, corn gluten feed, corn germ meal, soybean meal, dehulled soya grits and the like. The anticoccidial agents of this invention will be mixed in the physiologically acceptable carrier materials in any suitable effective anticoccidial quantity such as, for example, from about 0.01 to about 0.1% by weight and preferably from about .015 to about 0.033% by weight. The anticoccidial compositions prepared from the compounds of this invention may be administered to the animals in any ingestible form such as, for example, in solid or liquid poultry feeds, by incorporation into the animals' drinking water or by the use of supplements which contain a relatively large percentage of the coccidiostat and which may contain one or more additional products or other suitable non-toxic additives.

The following examples are illustrative of the invention:

EXAMPLE 1

9,10-diaza-10-phenyltetracyclo[6.3.0.0$^{4,11}$.0$^{5,9}$]undecane 3-phenylsydnone (10 g.) is reacted with a large excess of 1,5-cyclooctadiene (50 ml.) at a temperature of about 150° C. for a period of about 18 to 24 hours. The reaction product is cooled and diluted with ether and extracted two times with a 5 to 10% aqueous hydrochloric acid solution. The combined aqueous extracts are backwashed with ether to remove the last traces of neutral and acidic materials and then made basic with concentrated ammonium hydroxide solution. The milky mixture is extracted with generous portions of ether. The combined ether extracts are backwashed with water, dried, charcoaled and the solvent removed. The crude reaction product is recrystallized from ether-hexane to give, in two crops, 8.9 and 9.8 g. of the desired product. The analytical sample has a melting point of 81–82° C. The composition and structure of the compound was confirmed by elemental analyses, infra-red (IR) and proton magnetic resonance (PMR) spectra. In the data m.=multiplet; pr.=pair; t.=triplet; c.p.s.=cycles per second and m/e=mass/electron charge.

IR λ$_{max.}$ 3.41, 6.30, 6.71μ, PMR 1.55–1.92 (m., 8), 2.09–2.52 (pr. of m., 2), 3.27–3.62 (pr. of m., 2), 4.32–4.52 (t., 1, J=4 c.p.s.), 6.35–7.43 (m., 5); a crude mass spectrum was taken, it had major m/e values of 226 (parent and base peak), 227 (P+1, 11.8%), 228 (P+2, 5%), 226 (P−1, 2%), 159 (10.8%), 158 (12.5%), 157 (29%), 145 (15%), 134 (10%), 133 (25%), 121 (14%), 93 (31%), 91 (11%), 79 (16%), 78 (11%), 77 (45%), 68 (11%), 67 (15%), 55 (11%), 51 (16%).

*Analysis.* — Calculated for $C_{15}H_{18}N_2$ (percent): C, 79.60; H, 8.02; N, 12.38. Found (percent): C, 79.63; H, 7.93; N, 12.38.

A hydrochloride, M.P. 214–216° C., was prepared from an ethereal solution of the product by addition of excess ethereal hydrochloric acid, and filtration of the resulting precipitate.

*Analysis.*—Calculated for $C_{15}H_{19}N_2Cl$ (percent): C, 68.56; H, 7.29; N, 10.66. Found (percent): C, 68.92; H, 6.94; N, 10.75.

A picrate, M.P. 198–200° C., was prepared from an ethereal solution of the product by addition of several drops of saturated ethanolic solution of picric acid. The solid was recrystallized from ethanol; IR λ$_{max.}$ 3.3–4.0, 6.11, 6.19, 6.37, 6.66, 7.30μ.

*Analysis.*—Calculated for $C_{21}H_{21}N_5O_7$ (percent): C, 55.38; H, 4.65; N, 15.38. Found (percent): C, 55.09; H, 4.65; N, 15.76.

EXAMPLE 2

9,10-diaza-10,11-diphenyltetracyclo[6.3.0.0$^{4,11}$.0$^{5,9}$]undecane

The named compound (3.2 g.) was produced according to the procedure described in Example 1 by the reaction of 3-phenyl-4-phenylsydnone (5.7 g.) with excess 1,5-cyclooctadiene and recrystallized from ethanol. The compound had a melting point of 119–121° C. and the structure was confirmed by IR and PMR analysis.

*Analysis.*—Calculated for $C_{21}H_{22}N_2$: C, 83.40; H, 7.32; N, 9.26. Found (percent): C, 83.54; H, 7.31; N, 9.27.

EXAMPLE 3

9,10-diaza-10-(4-methylphenyl)tetracyclo[6.3.0.0$^{4,11}$.0$^{5,9}$]undecane

The named compound (8.3 g.) was produced according to the procedure described in Example 1 by reacting 3-(4-methylphenyl)sydnone (10 g.) with excess 1,5-cyclooctadiene and recrystallized from ethanol. The compound had a melting point of 114–118° C. and the structure was confirmed by IR and PMR analysis.

*Analysis.* — Calculated for $C_{16}H_{20}N_2$ (percent): C, 79.95; H, 8.39; N, 11.66. Found (percent): C, 79.91; H, 8.39; N, 11.78.

EXAMPLE 4

9,10-diaza-10-(4-methoxyphenyl)tetracyclo [6.3.0.0$^{4,11}$.0$^{5,9}$]undecane

The named compound (9.1 g.) was produced according to the procedure described in Example 1 by reacting 3-(4-methoxyphenyl)sydnone (10 g.) with excess 1,5-cyclooctadiene and recrystallized from ether-hexane. The compound had a melting point of 99–103° C. and the structure was confirmed by IR and PMR analysis.

*Analysis.*—Calculated for $C_{16}H_{20}N_2O$ (percent): C, 74.97; H, 7.86; N, 10.93. Found (percent): C, 74.90; H, 7.76; N, 10.85.

EXAMPLE 5

10-(4-chlorophenyl)-9,10-diazatetracyclo[6.3.0.0$^{4,11}$.0$^{5,9}$] undecane

The named compound (7.3 g.) was produced according to the procedure described in Example 1 by reacting 3-(4-chlorophenyl)sydnone (10 g.) with excess 1,5-cyclooctadiene and recrystallized from ether-hexane. The named compound had a melting point of 100–103° C. and the structure confirmed by IR and PMR analysis.

*Analysis.*—Calculated for $C_{15}H_{17}H_2Cl$ (percent): C, 69.08; H, 6.57; N, 10.74; Cl, 13.60. Found (percent): C, 69.09; H, 6.60; N, 10.67; Cl, 13.74.

EXAMPLE 6

9,10-diaza-10-(4-methyl-3-nitrophenyl)tetracyclo [6.3.0.0$^{4,11}$.0$^{5,9}$]undecane The named compound (2.7 g.) was produced according to the procedure described in Example 1 by reacting 3-(4-methyl-3-nitrophenyl)sydnone (11 g.) with excess 1,5-cyclooctadiene and recrystallized from ethanol. The compound had a melting point of 113–114° C. and the structure confirmed by IR and PMR analysis.

*Analysis.*—Calculated for $C_{25}H_9N_3O_2$ (percent): C, 65.91; H, 7.01; N, 15.37. Found (percent): C, 67.50; H, 6.60; N, 15.61.

EXAMPLE 7

10-(4-carboxyphenyl)-9,10-diazatetracyclo [6.3.0.0$^{4,11}$.0$^{5,9}$]undecane 2.5 grams of 3-(4-carboxyphenyl)sydnone was reacted with excess 1,5-cyclooctadiene at a temperature of 170° C. under nitrogen atmosphere for 72 hours and purified in a manner according to the method described in Example 1 to produce the named compound (0.6 g.) having a melting point of 245–247° C.

*Analysis.*—Calculated for $C_{16}H_{18}N_2O_2$ (percent): C, 71.08; H, 6.71; N, 10.36. Found (percent): C, 71.00; H, 6.67; N, 10.28.

EXAMPLE 8

9,10-diaza-11-methyl-10-phenyltetracyclo[6.3.0.0$^{4,11}$.0$^{5,9}$] undecane

In the manner described in Example 1, 3-phenyl-4-methylsydnone (1.75 g.) was reacted with excess 1,5-cyclooctadiene and the crude reaction product was chromatographed on silica gel in benzene. The product was passed quickly through the column and collected, the solvent was removed to produce the named compound (1.5 g.) as a light yellow liquid. The structure of the compound was confirmed by IR and PMR analysis.

*Analysis.* — Calculated for $C_{16}H_{20}N_3$ (percent): C, 79.96; H, 8.39; N, 11.66. Found (percent): C, 79.94; H, 8.41; N, 11.74. A picrate, melting point 175–177° C., was made from an ethanolic solution of the product and recrystallized from the same solvent.

*Analysis.*—Calculated for $C_{22}H_{23}N_5O_7$ (percent): C, 56.28; H, 4.94; N, 14.92. Found (percent): C, 56.00; H, 4.71; N, 14.58.

EXAMPLE 9

9,10-diaza-11-ethyl-10-phenyltetracyclo[6.3.0.0$^{4,11}$.0$^{5,9}$] undecane

The named compound (5.0 g. in three crops) was produced according to the procedure described in Example 1 by reacting 3-phenyl-4-ethylsydnone (6.8 g.) with excess 1,5-cyclooctadiene and recrystallized from ether and hexane. The compound had a melting point of 85–89° C. and the structure was confirmed by IR and PMR analysis.

*Analysis.* — Calculated for $C_{17}H_{22}N_2$ (percent): C, 80.26; H, 8.72; N, 11.01. Found (percent): C, 80.03; H, 8.45; N, 11.03.

EXAMPLE 10

10-benzyl-9,10-diazatetracyclo[6.3.0.0$^{4,11}$.0$^{5,9}$]undecane 3-benzylsydnone (26.4 g.) was reacted with a large excess of 1,5-cyclooctadiene (65 g.) according to the method described in Example 1 and the crude reaction product was chromatographed on grade 1, neutral, Woelm alumina (hexane packed). The product was washed into column with hexane. The fractions collected from the column were combined in ether, charcoaled, concentrated and distilled to give the named product (8.8 g.) having a boiling point 141° C/0.1 mm. The structure of the compound was confirmed by IR and PMR analysis.

*Analysis*—Calculated for $C_{16}H_{20}N_2$ (percent: C, 79.95; H, 8.39; N, 11.66. Found (percent): C, 80.10; H, 8.25; N, 11.64.

A hydrochloride was prepared from an ethereal solution of the product by reaction with ethereal hydrochloric acid. It was recrystallized from ethanol ether.

*Analysis.*—Calculated for $C_{16}H_{21}N_2Cl$ (percent): C, 69.42; H, 7.65; N, 10.12. Found (percent): C, 69.22; H, 7.53; N, 9.82.

A picrate was prepared from an ethanolic solution of the product and recrystallized from the same solvent.

*Analysis.*—Calculated for $C_{22}H_{23}N_5O_7$ (percent): C, 56.28; H, 4.95; N, 14.92. Found (percent): C, 56.17; H, 4.65; N, 14.60.

EXAMPLE 11

10-Acetyl-9,10-diazatetracyclo[6.3.0.0$^{4,11}$.0$^{5,9}$-]undecane 5.2 grams of the benzyl compound produced in Example 10 in 200 ml. of absolute ethanol was hydrogenolyzed in the presence of 1 gram of 10% palladium on carbon. Hydrogen uptake was slow. When the uptake was complete the catalyst was filtered off and the solvent removed to give a yellow liquid. This product was dissolved in benzene and treated with excess triethylamine and acetyl chloride. The solid was filtered off and the filtrate concentrated to a white solid which was crystallized from ether-hexane to give the named compound (1.5 g.) having a melting point of 133–135° C. The structure of the compound was confirmed by IR analysis.

*Analysis.*—Calculated for $C_{11}H_{16}N_2O$ (percent): C, 68.71; H, 8.39; N, 14.57. Found (percent): C, 68.75; H, 8.44; N, 14.69.

EXAMPLE 12

9,10-diaza-10-phenyltetracyclo[6.3.0.0$^{4,11}$.0$^{5,9}$] undecane-9-methiodide 9,10-diaza-10-phenyltetracyclo[6.3.0.0$^{4,11}$.0$^{5,9}$] undecane-10-methiodide 41.2 grams of the product of Example 1 in 800 ml. of acetone was treated with 51.8 grams of methyl iodide and placed in a dark place for 48 hours. The solid was filtered off, washed with acetone and recrystallized from the same solvent to give 16.9 grams of the first named compound having a melting point of 233–234° C. The structure of the compound was confirmed by IR and PMR analysis.

*Analysis.*—Calculated for $C_{16}H_{21}N_2I$ (percent): C, 52.18; H, 5.75; N, 7.61; I, 34.46. Found (percent): C, 52.35; H, 5.69; N, 7.56; I, 34.55.

The original filtrate from the production of the first named compound was diluted with ether and resulting solid filtered off and recrystallized twice from acetone-ether to give 26.3 grams of the second named compound having a double melting point of 145/233–224° C. The structure of the compound was confirmed by IR and PMR analysis.

*Analysis.*—Calculated for $C_{16}H_{21}N_2I$ (percent): C, 52.18; H, 5.75; N, 7.61; I, 34.46. Found (percent): C, 52.29; H, 5.77; N, 7.67; I, 34.34.

What is claimed is:

1. A compound having the formula

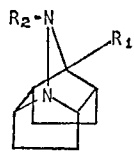

wherein $R_1$ and $R_2$ are individually selected from the group consisting of hydrogen, alkyl containing from 1 to 4 carbon atoms, lower alkanoyl, benzyl, phenyl or a phenyl radical substituted by at least one substituent selected from the group consisting of lower alkyl having from 1 to 4 carbon atoms, lower alkoxy having from 1 to 4 carbon atoms, carboxy, halogen or nitro, with the proviso that the nitrogen atoms of the 9,10-diazatetracyclo-[6.3.0.0$^{4,11}$.0$^{5,9}$] undecane compound may be quaternized with lower alkyl radicals.

2. A compound of claim 1 wherein $R_2$ is phenyl and $R_1$ is hydrogen.

3. A compound of claim 1 wherein $R_1$ is phenyl and $R_2$ is phenyl.

4. A compound of claim 1 wherein $R_2$ is 4-methyl-3-nitrophenyl and $R_1$ is hydrogen.

5. A compound of claim 1 wherein $R_2$ is 4-methylphenyl and $R_1$ is hydrogen.

6. A compound of claim 1 wherein $R_2$ is 4-methoxyphenyl and $R_1$ is hydrogen.

7. A compound of claim 1 wherein $R_2$ is 4-chlorophenyl and $R_1$ is hydrogen.

8. A process for the production of a compound of claim 1 wherein a sydnone having the formula

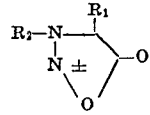

wherein $R_1$ and $R_2$ are as defined in claim 1 is reacted with 1,5-cyclooctadiene at an elevated temperature of at least to 150° C.

References Cited

Gotthardt et al.: Chem. Ber. 101(3), 1056-8(1968); Chem. Abstracts 68:78193 p. (1968).

HENRY R. JILES, Primary Examiner

G. T. TODD, Jr. Assistant Examiner

U.S. Cl. X.R.

260—307 F; 424—267

UNITED STATES PATENT OFFICE
CERTIFICATE OF CORRECTION

PATENT NO. : 3,686,185
DATED : August 22, 1972
INVENTOR(S) : Philip M. Weintraub and John R. Challey It is certified that error appears in the above-identified patent and that said Letters Patent are hereby corrected as shown below:

Column 1, line 43 -- "Indecane" should read "undecane"; line 57 -- "acyl" should read "lower alkanoyl" (amendment C filed February 9, 1972). Column 2, line 8 -- "4-methoxyphenyl and the like" should read "4-methoxyphenyl, 4-chlorophenyl, 4-methyl-3-nitrophenyl, 4-carboxyphenyl and the like"; line 43 --

   should read   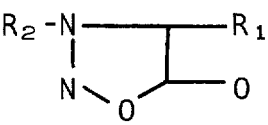 .

Column 3, line 32 -- "[6.3.0$^{411}$.0$^{5,9}$]" should read "[6.3.0.0$^{4,11}$.0$^{5,9}$]". Column 5, lines 39-40 -- "temperature of 170°C." should read "temperature of about 170°C.". Column 6, line 73 -- "145/233-224°C." should read "145/223-224°C.".

Signed and Sealed this twenty-first Day of October 1975

[SEAL]

Attest:

RUTH C. MASON
Attesting Officer

C. MARSHALL DANN
Commissioner of Patents and Trademarks